US012650785B2

(12) United States Patent
Shi et al.

(10) Patent No.: US 12,650,785 B2
(45) Date of Patent: Jun. 9, 2026

(54) DATA TRANSMISSION CIRCUIT, DATA TRANSMISSION METHOD, AND ELECTRONIC DEVICE

(71) Applicant: VIVO MOBILE COMMUNICATION CO., LTD., Guangdong (CN)

(72) Inventors: Jiayue Shi, Guangdong (CN); Jiajun Xu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/944,310

(22) Filed: Nov. 12, 2024

(65) Prior Publication Data

US 2025/0068353 A1     Feb. 27, 2025

Related U.S. Application Data

(63) Continuation of application No. PCT/CN2023/095981, filed on May 24, 2023.

(30) Foreign Application Priority Data

May 31, 2022     (CN) .......................... 202210619178.9

(51) Int. Cl.
    *G06F 3/06*              (2006.01)
(52) U.S. Cl.
    CPC .......... *G06F 3/0655* (2013.01); *G06F 3/0604* (2013.01); *G06F 3/0679* (2013.01)
(58) Field of Classification Search
    None
    See application file for complete search history.

(56) References Cited

U.S. PATENT DOCUMENTS

| | | | | |
|---|---|---|---|---|
| 8,477,918 B2* | 7/2013 | Ozawa | ............... | H04N 21/4788 |
| | | | | 455/414.1 |
| 10,282,109 B1* | 5/2019 | Teh | ........................ | G06F 3/0611 |
| 11,645,222 B1* | 5/2023 | Prentice | .............. | G06F 13/4282 |
| | | | | 710/61 |
| 2009/0268755 A1* | 10/2009 | Inoishi | .................. | H04L 65/103 |
| | | | | 370/466 |

(Continued)

FOREIGN PATENT DOCUMENTS

| | | |
|---|---|---|
| CN | 101645053 A | 2/2010 |
| CN | 106294234 A | 1/2017 |

(Continued)

*Primary Examiner* — Jared I Rutz
*Assistant Examiner* — Elias Young Kim
(74) *Attorney, Agent, or Firm* — Price Heneveld LLP

(57) ABSTRACT

This application discloses a data transmission circuit, a data transmission method, and an electronic device. The data transmission circuit includes a storage chip, a data transit chip, and a data processing chip. The storage chip, the data transit chip, and the data processing chip are sequentially connected in series. The data transit chip is configured to read a first data packet with a first preset quantity of bits from the storage chip, process the first data packet into a plurality of second data packets each with a second preset quantity of bits, and send the second data packets to the data processing chip. A maximum quantity of bits of a data packet that the data processing chip is able to read at a time is a third preset quantity of bits.

12 Claims, 3 Drawing Sheets

(56)     References Cited

U.S. PATENT DOCUMENTS

| | | | | |
|---|---|---|---|---|
| 2009/0307540 A1* | 12/2009 | Razazian | .......... | H04L 25/03834 |
| | | | | 714/701 |
| 2011/0019668 A1* | 1/2011 | Diab | .................... | H04L 47/564 |
| | | | | 370/389 |
| 2014/0149653 A1* | 5/2014 | Udipi | ...................... | G06F 12/08 |
| | | | | 711/202 |
| 2017/0287384 A1* | 10/2017 | Lee | ........................ | G09G 5/395 |
| 2021/0294535 A1 | 9/2021 | Wang et al. | | |
| 2022/0005397 A1* | 1/2022 | Orio | ......................... | H04N 9/30 |
| 2022/0070105 A1* | 3/2022 | Brewer | ................... | H04L 47/34 |
| 2022/0329354 A1 | 10/2022 | Zhou | | |
| 2022/0391099 A1* | 12/2022 | Cooper | ............... | H03M 7/4043 |
| 2023/0018464 A1* | 1/2023 | Ra | ........................ | G11C 7/1087 |
| 2025/0068353 A1 | 2/2025 | Shi et al. | | |

FOREIGN PATENT DOCUMENTS

| | | | |
|---|---|---|---|
| CN | 111222306 A | 6/2020 |
| CN | 112256626 A | 1/2021 |
| CN | 114063932 A | 2/2022 |
| CN | 115048049 A | 9/2022 |
| KR | 20220047546 A | 4/2022 |

* cited by examiner

DATA TRANSMISSION CIRCUIT, DATA TRANSMISSION METHOD, AND ELECTRONIC DEVICE

CROSS-REFERENCE TO RELATED APPLICATIONS

This application is a Bypass Continuation Application of PCT International Application No. PCT/CN2023/095981 filed on May 24, 2023, which claims priority to Chinese Patent Application No. 202210619178.9, filed on May 31, 2022, which are incorporated herein by reference in their entireties.

TECHNICAL FIELD

This application pertains to the field of electronic circuit technologies, and specifically, relates to a data transmission circuit, a data transmission method, and an electronic device.

BACKGROUND

At present, because a built-in RAM of a display driver integrated circuit (DDIC) in an electronic device has an insufficient capacity, many parameters required by the electronic device (for example, a color curve parameter used as a screen display parameter) are programmed in an external flash.

In some cases, when the electronic device is powered on properly, a CPU in the electronic device needs to read parameters from the flash through the DDIC. However, the flash supports reading of 200 valid bytes at a time, but the CPU can read only 10 valid bytes at a time because there is a limitation on a MIPI buffer. Therefore, 200 valid bytes of data directly read by the DDIC from the flash cannot be read by the CPU. In other words, the CPU cannot read data in the flash. This leads to a function exception in the electronic device.

SUMMARY

According to a first aspect, an embodiment of this application provides a data transmission circuit, including a storage chip, a data transit chip, and a data processing chip.

The storage chip, the data transit chip, and the data processing chip are sequentially connected in series.

The data transit chip is configured to read a first data packet with a first preset quantity of bits from the storage chip, process the first data packet into a plurality of second data packets each with a second preset quantity of bits, and send the second data packets to the data processing chip.

A maximum quantity of bits of a data packet that the data processing chip is able to read at a time is a third preset quantity of bits, the second preset quantity of bits is less than or equal to the third preset quantity of bits, and the first preset quantity of bits is greater than the third preset quantity of bits.

According to a second aspect, an embodiment of this application provides a data transmission method, applied to the data transmission circuit according to the first aspect, where the method includes:

reading, by a data transit chip, a first data packet with a first preset quantity of bits from a storage chip;

processing, by the data transit chip, the first data packet into a plurality of second data packets each with a second preset quantity of bits; and sending, by the data transit chip, the second data packets to a data processing chip.

A maximum quantity of bits of a data packet that the data processing chip is able to read at a time is a third preset quantity of bits, the second preset quantity of bits is less than or equal to the third preset quantity of bits, and the first preset quantity of bits is greater than the third preset quantity of bits.

According to a third aspect, an embodiment of this application provides an electronic device, including the data transmission circuit according to the first aspect.

REFERENCE NUMERALS

100—data transmission circuit; 110—storage chip; 120—data transit chip; 121—read module;

122—first cache module; 123—decoding module; 124—second cache module; 125—encoding module;

1251—encoding unit; 1252—editing unit; 130—data processing chip; 131—third cache module;

132—memory module; 140—display driver integrated circuit.

DETAILED DESCRIPTION

The technical solutions in embodiments of this application are clearly described in the following with reference to accompanying drawings in embodiments of this application. Apparently, the described embodiments are some rather than all of embodiments of this application. All other embodiments obtained by a person of ordinary skill in the art based on embodiments of this application fall within the protection scope of this application.

In the specification and the claims of this application, terms such as "first" and "second" are used to distinguish between similar objects rather than to describe a specific sequence or order. It should be understood that data used in this way is exchangeable in a proper case, so that embodiments of this application can be implemented in an order different from the order illustrated or described herein. The objects distinguished by "first", "second", and the like are usually of a same category, and a quantity of the objects is not limited. For example, there may be one or more first objects. In addition, in the specification and the claims, "and/or" indicates at least one of connected objects, and the character "/" usually indicates an "or" relationship between associated objects.

With reference to the accompanying drawings, the following describes, in detail based on the specific embodiments and application scenarios thereof, a data transmission circuit, a data transmission method, and an electronic device that are provided in the embodiments of this application.

Figure 1:
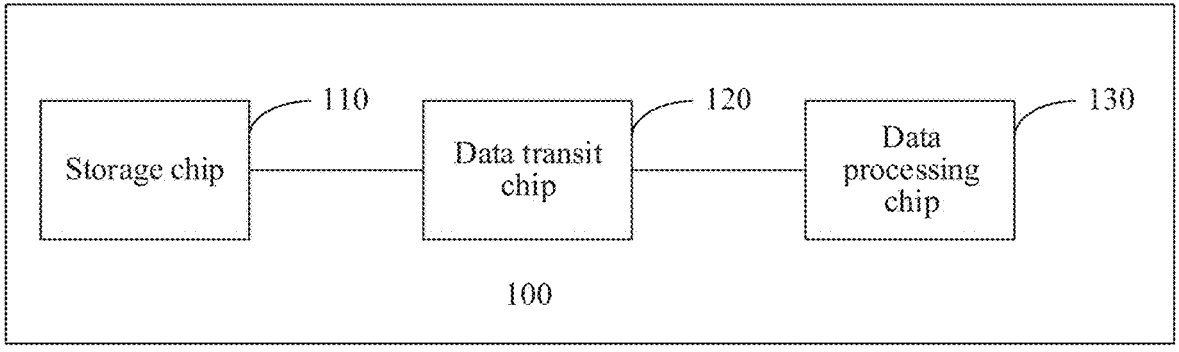
FIG. 1 is a schematic 1 of a structure of a data transmission circuit according to an embodiment of this application.

An embodiment of this application provides a data transmission circuit 100. As shown in FIG. 1, the data transmission circuit 100 includes a storage chip 110, a data transit chip 120, and a data processing chip 130.

The storage chip 110, the data transit chip 120, and the data processing chip 130 are sequentially connected in series.

The data transit chip 120 is configured to read a first data packet with a first preset quantity of bits from the storage chip 110, process the first data packet into a plurality of second data packets each with a second preset quantity of bits, and send the second data packets to the data processing chip 130.

A maximum quantity of bits of a data packet that the data processing chip 130 is able to read at a time is a third preset quantity of bits, the second preset quantity of bits is less than or equal to the third preset quantity of bits, and the first preset quantity of bits is greater than the third preset quantity of bits.

In this embodiment of this application, the storage chip 110 is configured to store data. The data may be, for example, a color curve parameter among screen display parameters of an electronic device.

In an embodiment of this application, the storage chip 110 may be, for example, a flash.

In an embodiment of this application, the data transit chip 120 may be a frame interpolation chip. In this embodiment of this application, the data transit chip 120 in this embodiment of this application is implemented by using a frame interpolation chip, so that there is no need to develop a new chip. Based on this, hardware costs and design difficulty of the data transmission circuit 100 provided in this embodiment of this application can be reduced.

In an embodiment of this application, the data processing chip 130 may be a CPU.

In this embodiment of this application, the data transit chip 120 reads the first data packet with the first preset quantity of bits from the storage chip 110, and processes the first data packet into the plurality of second data packets each with the second preset quantity of bits. Because the second preset quantity of bits is less than or equal to the third preset quantity of bits and the third preset quantity of bits is the maximum quantity of bits of a data packet that the data processing chip 130 is able to read at a time, the data processing chip 130 may read the second data packets after the data transit chip 120 sends the second data packets to the data processing chip 130. Based on this, the data processing chip 130 can indirectly read the first data packet by reading the plurality of consecutive second data packets each with the second preset quantity of bits. In other words, the data transmission circuit 100 provided in this embodiment of this application can resolve a problem that the data processing chip 130 cannot read the first data packet with the first preset quantity of bits. Based on this, in a case that the data processing chip 130 is a CPU and the storage chip 110 is a flash, the CPU can still indirectly read data in the flash although there is a limitation on a MIPI buffer. This resolves a problem that the CPU cannot read the data in the flash.

In addition, for the data transmission circuit 100 provided based on this embodiment of this application, there is no need to improve a memory module in the data processing chip 130 to enable the memory module to support the first data packet with the first preset quantity of bits. This lowers a requirement on the data processing chip 130.

In an example, the first preset quantity of bits is 200 bits.

It should be noted that, in a case that the second data packets include only valid data, the second preset quantity of bits is less than or equal to the third preset quantity of bits.

In a case that the second data packets further include other data (for example, a verification code, a start character, and an end character) in addition to valid data, the second preset quantity of bits is less than the third preset quantity of bits, and a sum of the second preset quantity of bits and a quantity of bits corresponding to the other data is less than or equal to the third preset quantity of bits.

In this embodiment of this application, the data transmission circuit is provided. The data transmission circuit includes the storage chip, the data transit chip, and the data processing chip, where the storage chip, the data transit chip, and the data processing chip are sequentially connected in series; the data transit chip is configured to read the first data packet with the first preset quantity of bits from the storage chip, process the first data packet into the plurality of second data packets each with the second preset quantity of bits, and send the second data packets to the data processing chip; and the maximum quantity of bits of a data packet that the data processing chip is able to read at a time is the third preset quantity of bits, the second preset quantity of bits is less than or equal to the third preset quantity of bits, and the first preset quantity of bits is greater than the third preset quantity of bits. The data transmission circuit provided in this embodiment of this application can resolve the problem that the data processing chip cannot read the first data packet with the first preset quantity of bits. Based on this, in the case that the data processing chip is a CPU and the storage chip is a flash, the CPU can still indirectly read the data in the flash although there is the limitation on the MIPI buffer. This resolves the problem that the CPU cannot read the data in the flash.

Figure 2:
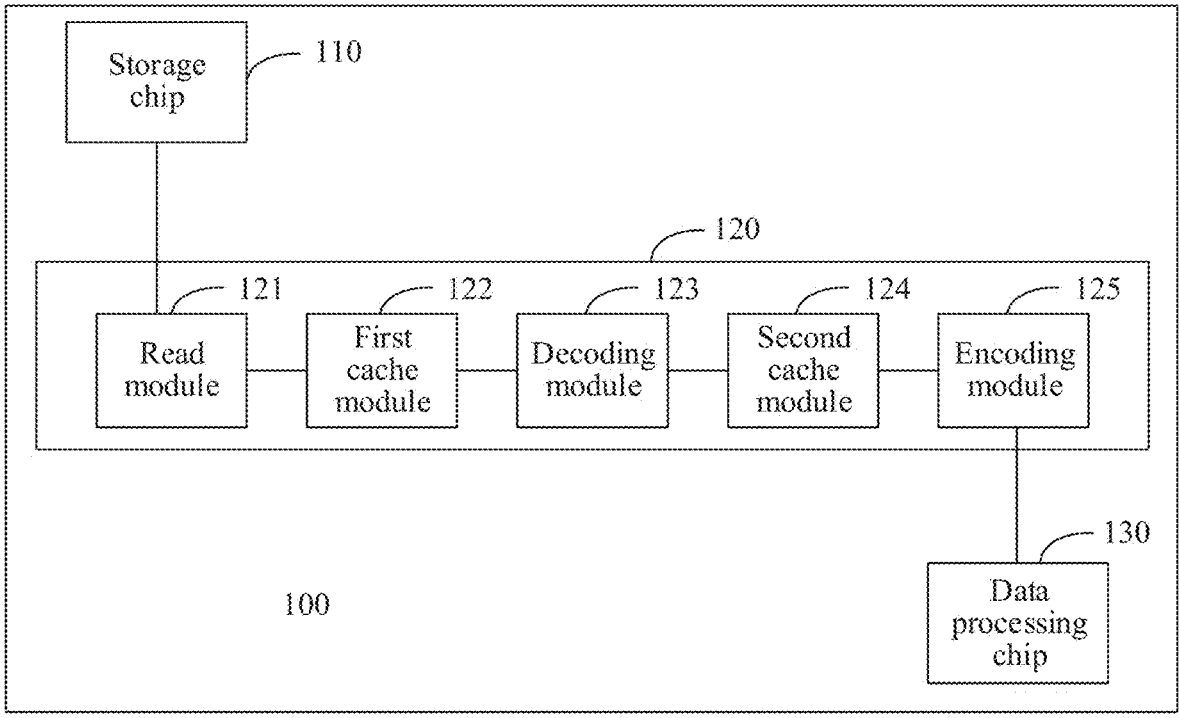
FIG. 2 is a schematic 2 of a structure of a data transmission circuit according to an embodiment of this application.

In an embodiment of this application, as shown in FIG. 2, a data transit chip 120 includes a read module 121, a first cache module 122, a decoding module 123, a second cache module 124, and an encoding module 125.

A first end of the read module 121 is connected to a storage chip 110.

A second end of the read module 121, a first end of the first cache module 122, a second end of the first cache module 122, the decoding module 123, the second cache module 124, and a first end of the encoding module 125 are sequentially connected in series.

A second end of the encoding module 125 is connected to a data processing chip 130.

The read module 121 reads a first data packet with a first preset quantity of bits from the storage chip 110 and saves the first data packet in the first cache module 122, the decoding module 123 decodes the first data packet cached in the first cache module 122 and saves decoded data in the second cache module 124, and the encoding module 125 encodes, into a plurality of second data packets each with a second preset quantity of bits, data that is read from the second cache module 124.

In this embodiment of this application, a manner in which the read module 121 reads the first data packet with the first preset quantity of bits from the storage chip 110 and saves the first data packet in the first cache module 122 may be as follows: The read module 121 determines a data reading instruction, where the data reading instruction includes an address of to-be-read data in the storage chip 110; the read module 121 reads, according to the reading instruction, data from an address in the storage chip 110 that is the same as the address included in the reading instruction; the data is denoted as the first data packet, and a size of the data is the first preset quantity of bits; and the read module 121 caches the first data packet in the first cache module 122.

The manner in which the read module 121 reads the first data packet with the first preset quantity of bits from the storage chip 110 and saves the first data packet in the first cache module 122 may alternatively be as follows: The read module 121 is connected to the storage chip 110 by a display driver integrated circuit 140; the read module 121 sends a data reading instruction like the foregoing one to the display driver integrated circuit 140; the display driver integrated circuit 140 reads, according to the data reading instruction, data from an address in the storage chip 110 that is the same as an address included in the reading instruction; the data is denoted as the first data packet, and a size of the data is the first preset quantity of bits; and the display driver integrated circuit 140 caches the first data packet in the first cache module 122. It should be noted that in this manner, the first cache module 122 needs to notify the read module 121 of related information that is stored.

The first cache module 122 is a cache module with a high data transmission rate, so as to be suitable for fast reading performed by the read module 121.

In this embodiment of this application, the decoding module 123 decodes the first data packet cached in the first cache module 122, so that the first data packet is decoded into a format that can be recognized by the second cache module 124; and saves decoded data in the second cache module. A size of each data packet stored in the second cache module 124 is usually 1 bit.

In an embodiment of this application, the second cache module 124 is a module with a high storage capacity. For example, the second cache module 124 may be, for example, a frame buffer.

The encoding module 125 reads the data from the second cache module 124, and processes the data into the second data packets each with the second preset quantity of bits. The processing at least includes encoding the read data into a format that can be recognized by the data processing chip 130. Further, the processing may further include adding start characters to packet headers, and adding end characters to packet trailers or adding verification codes and end characters to packet trailers of data packets encoded in the format that can be recognized by the data processing chip 130, after the read data is encoded into the format that can be recognized by the data processing chip 130.

In this embodiment of this application, a specific structure of the data transit chip 120 is provided. The structure is simple and easy to implement. This can reduce the hardware costs of the data transmission circuit provided in this embodiment of this application.

Figure 3:
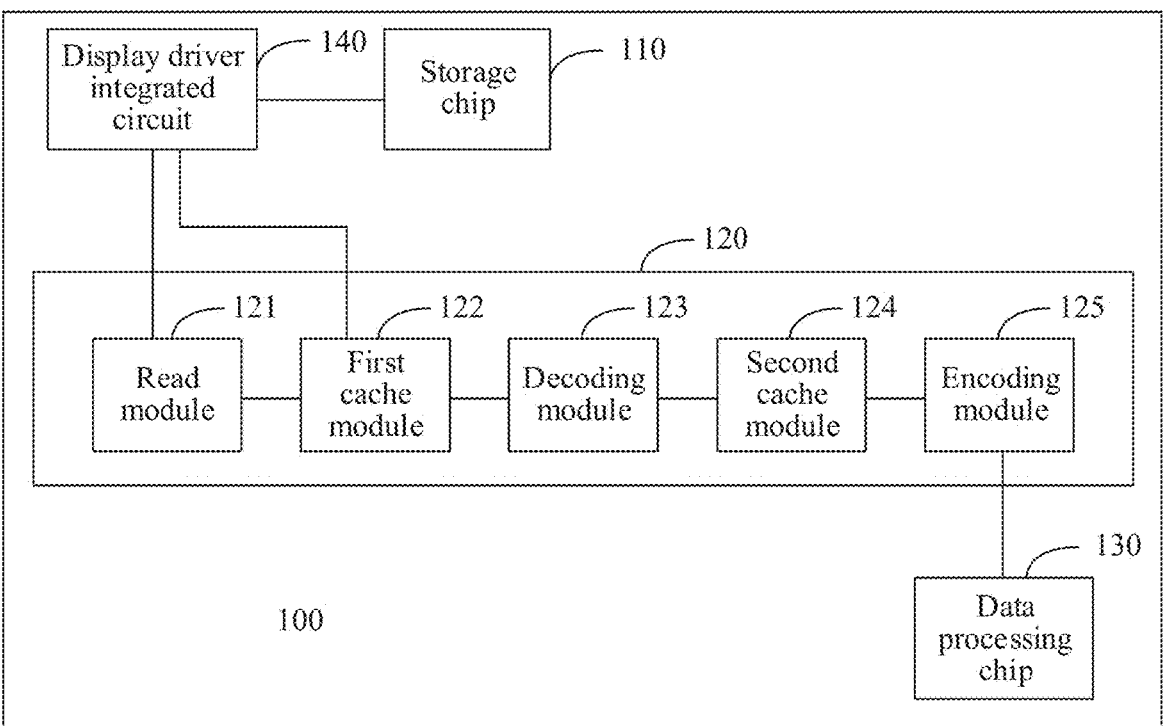
FIG. 3 is a schematic 3 of a structure of a data transmission circuit according to an embodiment of this application.

It can be understood that based on the foregoing manner in which the read module 121 sends the data reading instruction to the display driver integrated circuit 140 to read the first data packet, as shown in FIG. 3, the data transmission circuit 100 provided in this embodiment of this application further includes a display driver integrated circuit 140.

The display driver integrated circuit 140 includes a first end, a second end, and a third end, and a first cache module 122 further includes a third end.

The first end of the display driver integrated circuit 140 is connected to a storage chip 110, the second end of the display driver integrated circuit 140 is connected to a first end of a read module 121, and the third end of the display driver integrated circuit 140 is connected to the third end of the first cache module 122.

Based on the foregoing content, that the read module 121 reads a first data packet with a first preset quantity of bits from the storage chip 110 and saves the first data packet in the first cache module 122 includes:

the read module 121 sends a data reading instruction to the display driver integrated circuit 140; and the display driver integrated circuit 140 reads the first data packet with the first preset quantity of bits from the storage chip 110 according to the data reading instruction, and saves the first data packet in the first cache module 122.

In this embodiment of this application, the read module 121 reads the first data packet by sending the data reading instruction to the display driver integrated circuit 140. For an electronic device that integrates the storage chip 110 and the display driver integrated circuit 140, there is no need to improve hardware. This reduces the hardware costs of the data transmission circuit 100 provided in this embodiment of this application.

Figure 4:
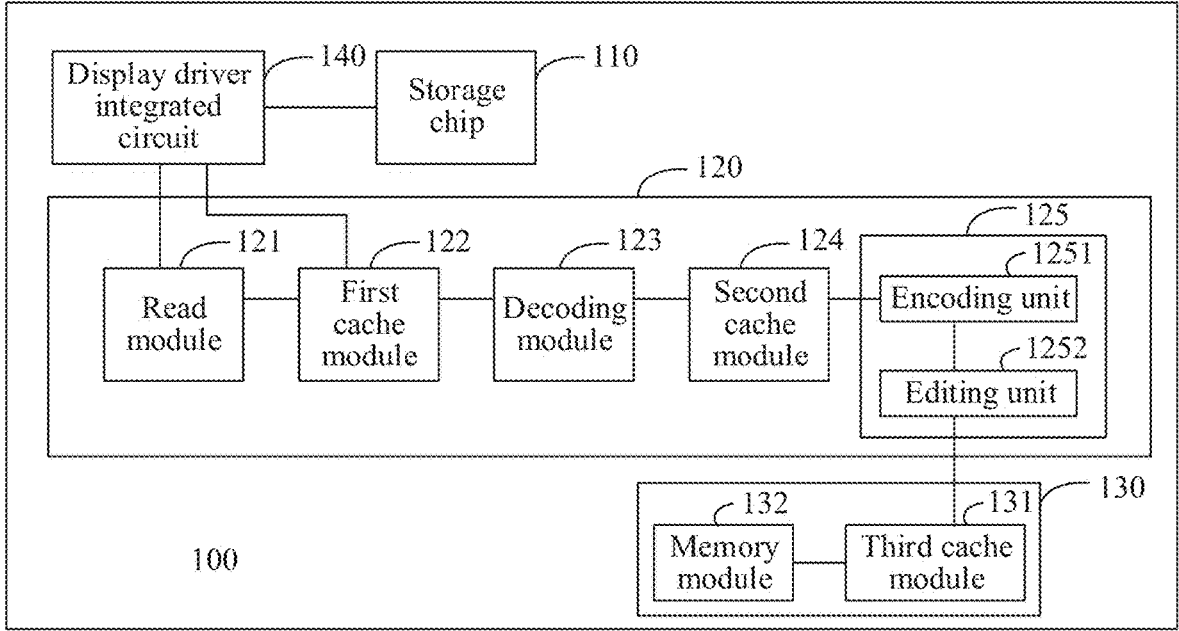
FIG. 4 is a schematic 4 of a structure of a data transmission circuit according to an embodiment of this application.

In an embodiment of this application, as shown in FIG. 4, an encoding module 125 includes an encoding unit 1251 and an editing unit 1252.

The encoding unit 1251 includes a first end and a second end, and the editing unit 1252 includes a first end and a second end.

The first end of the encoding unit 1251 is connected to a second cache module 124, and the second end of the encoding unit 1251 is connected to the first end of the editing unit 1252.

The second end of the editing unit 1252 is connected to a data processing chip 130.

In this embodiment of this application, the encoding unit 1251 encodes, into a plurality of second data packets, data that is read from the second cache module.

In an embodiment of this application, for any one of the second data packets, the editing unit 1252 adds a start character to a packet header of the second data packet and adds an end character to a packet trailer of the second data packet, to update the second data packet; and sends the updated second data packet to the data processing chip 130.

In this embodiment of this application, by adding a start character to a packet header and adding an end character to a packet trailer of a second data packet, the editing unit 1252 may enable the data processing chip 130 to obtain an accurate second data packet based on the start character and the end character.

In an embodiment of this application, the editing unit 1252 generates a first verification code for the any one of the second data packets based on the second data packet.

For the any one of the second data packets, a start character is added to a packet header of the second data packet, and the first verification code and an end character are sequentially added to a packet trailer of the second data packet, to update the second data packet. The updated second data packet is sent to the data processing chip 130.

In this embodiment of this application, the editing unit 1252 may generate a first verification code based on a second data packet by using a first verification algorithm, for example, a CRC verification algorithm. A quantity of digits of the first verification code is usually fixed. It should be noted that the data processing chip 130 includes the same first verification algorithm.

In this embodiment of this application, after obtaining a data packet sent by the editing unit 1252, the data processing chip 130 identifies a start character, a second data packet, a first verification code, and an end character. Further, the data processing chip 130 determines a verification code based on the second data packet and the same first verification algorithm, and denotes the verification code as a first check verification code. Still further, the data processing chip 130 determines whether the first check verification code is the same as the first verification code according to the first check verification code. In a case that the first check verification code is the same as the first verification code, the second data packet is determined to be correct. In a case that the first check verification code is different from the first verification code, the second data packet is determined to be incorrect. In a case that the second data packet is determined to be incorrect, a data transit chip 120 is notified to retransmit the second data packet. Based on this, the data processing chip 130 may obtain a correct second data packet.

In an embodiment of this application, as shown in FIG. 4, a data processing chip 130 includes a third cache module 131 and a memory module 132.

The third cache module 131 includes a first end and a second end, the first end of the third cache module 131 is connected to an encoding module 125, and the second end of the third cache module 131 is connected to the memory module 132.

In this embodiment of this application, after obtaining second data packets, the data processing chip 130 saves the second data packets in the third cache module 131, and then the third cache module 131 dumps the second data packets to the memory module 132, so that the second data packets are stably stored in the data processing chip 130 for use by a display screen or another component of an electronic device.

In an embodiment of this application, the first data packet includes valid data and a second verification code. That the read module 121 reads the first data packet with the first preset quantity of bits from the storage chip 110 and saves the first data packet in the first cache module specifically includes:

based on the valid data and the second verification code in the first data packet, determining whether the first data packet is correct; and in a case that the first data packet is determined to be correct, saving the first data packet in the first cache module 122.

In this embodiment of this application, based on the valid data in the first data packet and a second verification algorithm, for example, a CRC verification algorithm, a verification code corresponding to the valid data in the first data packet is determined and is denoted as a second check verification code. It should be noted that the storage chip 110 includes the same second verification algorithm. The storage chip 110 generates, based on the same second verification algorithm, the second verification code for data that is read, so as to add the second verification code to a valid data packet to form the first data packet.

The read module 121 determines whether the second verification code is the same as the second check verification code. In a case that the second verification code is the same as the second check verification code, the first data packet is determined to be correct. In this case, the first data packet is saved in the first cache module 122. In a case that the second verification code is different from the second check verification code, the first data packet with the first preset quantity of bits is read from the storage chip 110 again.

In an embodiment of this application, an electronic device is provided. The electronic device includes the data transmission circuit 100 according to any one of the foregoing embodiments.

In an embodiment of this application, the electronic device may be, for example, a mobile phone, a tablet computer, a notebook computer, a palmtop computer, a vehicle-mounted electronic device, a mobile Internet device (MID), an augmented reality (AR) or a virtual reality (VR) device, a robot, a wearable device, an ultra-mobile personal computer (UMPC), a netbook, a personal digital assistant (PDA), or the like, or may be a server, a network attached storage (NAS), a personal computer (PC), a television (TV), a teller machine, a self-service machine, or the like. This is not specifically limited in this embodiment of this application.

Figure 5:
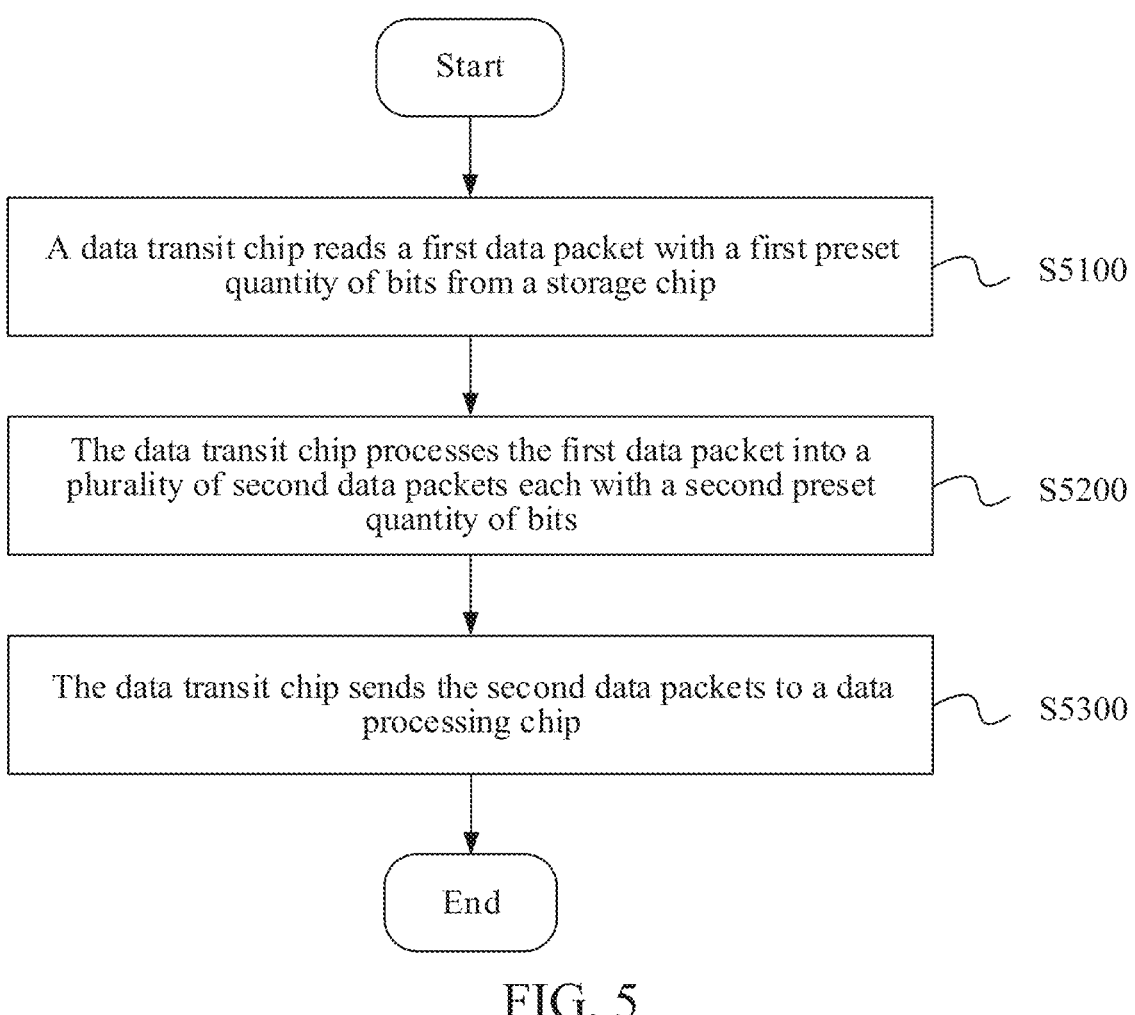
FIG. 5 is a schematic flowchart of a data transmission method according to an embodiment of this application.

An embodiment of this application further provides a data transmission method. The method is applied to the data transmission circuit 100 according to any one of the foregoing embodiments, and as shown in FIG. 5, includes the following S5100 to S5300.

S5100: A data transit chip 120 reads a first data packet with a first preset quantity of bits from a storage chip 110.

S5200: The data transit chip 120 processes the first data packet into a plurality of second data packets each with a second preset quantity of bits.

S5300: The data transit chip 120 sends the second data packets to a data processing chip 130.

A maximum quantity of bits of a data packet that the data processing chip 130 is able to read at a time is a third preset quantity of bits, the second preset quantity of bits is less than or equal to the third preset quantity of bits, and the first preset quantity of bits is greater than the third preset quantity of bits.

In this embodiment of this application, the data transmission method is provided. The method is applied to the data transmission circuit according to the any one of the foregoing embodiments, and includes: reading, by the data transit chip, the first data packet with the first preset quantity of bits from the storage chip; processing the first data packet into the plurality of second data packets each with the second preset quantity of bits; and sending, by the data transit chip, the second data packets to the data processing chip. The first preset quantity of bits is greater than the second preset quantity of bits. The maximum quantity of bits of a data packet that the data processing chip is able to read at a time is the third preset quantity of bits. The second preset quantity of bits is less than or equal to the third preset quantity of bits. The data transmission method provided in this embodiment of this application can resolve a problem that the data processing chip cannot read the first data packet with the first preset quantity of bits. Based on this, in a case that the data processing chip 130 is a CPU and the storage chip is a flash, the CPU can still indirectly read data in the flash although there is a limitation on a MIPI buffer. This resolves a problem that the CPU cannot read the data in the flash.

In an embodiment of this application, the data transit chip 120 includes a read module 121, a first cache module 122, a decoding module 123, a second cache module 124, and an encoding module 125. Based on this, a specific implementation of the foregoing S5100 may be the following S5110.

S5110: The read module 121 reads the first data packet with the first preset quantity of bits from the storage chip 110, and saves the first data packet in the first cache module.

A specific implementation of the foregoing S5200 may be the following S5210 and S5220.

S5210: The decoding module decodes the first data packet cached in the first cache module, and saves decoded data in the second cache module.

S5220: The encoding module processes, into the plurality of second data packets each with the second preset quantity of bits, data that is read from the second cache module.

In an embodiment of this application, a specific implementation of the foregoing S5110 may be the following S5111 and S5112.

S5111: The read module 121 sends a data reading instruction to a display driver integrated circuit 140.

S5112: The display driver integrated circuit 140 reads the first data packet with the first preset quantity of bits from the storage chip 110 according to the data reading instruction, and saves the first data packet in the first cache module 122.

In an embodiment of this application, the encoding module 125 includes an encoding unit 1251 and an editing unit 1252. Based on this, a specific implementation of the foregoing S5220 may be the following S5221 and S5222.

S5221: The encoding unit 1251 encodes, into the plurality of second data packets each with the second preset quantity of bits, the data that is read from the second cache module.

S5222: The editing unit 1252 generates a first verification code for any one of the second data packets based on the second data packet.

For the any one of the second data packets, a start character is added to a packet header of the second data packet and the first verification code and an end character are sequentially added to a packet trailer of the second data packet, to update the second data packet. The updated second data packet is sent to the data processing chip 130.

It should be noted that for implementation of the steps in the foregoing method embodiments, reference may be made to the specific related implementation of the foregoing data transmission circuit 100. Details are not described herein again.

It should be noted that the term "include", "comprise", or any other variation thereof in this specification is intended to cover a non-exclusive inclusion, so that a process, a method, an article, or an apparatus that includes a list of elements not only includes those elements but also includes other elements that are not expressly listed, or further includes elements inherent to the process, method, article, or apparatus. In absence of more constraints, an element preceded by "includes a . . . " does not preclude existence of other identical elements in the process, method, article, or apparatus that includes the element. In addition, it should be noted that in the scope of the method and apparatus in embodiments of this application, an order in which functions are performed is not limited to the shown or discussed order, and may further include an order in which the functions are substantially performed at the same time or a reverse order, depending on the related functions. For example, the described method may be performed in an order different from the described order, and steps may be added, omitted, or combined. In addition, features described with reference to some examples may be combined in other examples.

According to the descriptions of the foregoing implementations, a person skilled in the art can clearly understand that the method in the foregoing embodiments may be implemented by software and a necessary universal hardware platform or by hardware only. In most cases, the former is a better implementation. Based on such an understanding, the technical solutions of this application essentially, or the part contributing to the prior art, may be presented in the form of a computer software product. The computer software product is stored in a storage medium (for example, a ROM/RAM, a magnetic disk, or an optical disc), and includes several instructions to enable a terminal (which may be a mobile phone, a computer, a server, a network device, or the like) to perform the method described in embodiments of this application.

Embodiments of this application are described above with reference to the accompanying drawings. However, this application is not limited to the foregoing specific embodiments. The foregoing specific embodiments are only illustrative rather than restrictive. Inspired by this application, a person of ordinary skill in the art can still derive a plurality of variations without departing from the essence of this application and the protection scope of the claims. All these variations shall fall within the protection of this application.

What is claimed is:

1. A data transmission circuit, comprising a storage chip, a data transit chip, and a data processing chip, wherein the storage chip, the data transit chip, and the data processing chip are sequentially connected in series;

the data transit chip is configured to read a first data packet with a first preset quantity of bits from the storage chip, process the first data packet into a plurality of second data packets each with a second preset quantity of bits, and send the second data packets to the data processing chip; and a maximum quantity of bits of a data packet that the data processing chip is able to read at a time is a third preset quantity of bits, the second preset quantity of bits is less than or equal to the third preset quantity of bits, and the first preset quantity of bits is greater than the third preset quantity of bits;

wherein the data transit chip comprises a read module, a first cache module, a decoding module, a second cache module, and an encoding module, wherein a first end of the read module is connected to the storage chip;

a second end of the read module, a first end of the first cache module, a second end of the first cache module, the decoding module, the second cache module, and a first end of the encoding module are sequentially connected in series; and a second end of the encoding module is connected to the data processing chip, wherein the read module reads the first data packet with the first preset quantity of bits from the storage chip and saves the first data packet in the first cache module, the decoding module decodes the first data packet cached in the first cache module and saves decoded data in the second cache module, and the encoding module processes, into the plurality of second data packets each with the second preset quantity of bits, data that is read from the second cache module;

wherein the data transmission circuit further comprises a display driver integrated circuit, wherein the display driver integrated circuit comprises a first end, a second end, and a third end, and the first cache module further comprises a third end; and the first end of the display driver integrated circuit is connected to the storage chip, the second end of the display driver integrated circuit is connected to the first end of the read module, and the third end of the display driver integrated circuit is connected to the third end of the first cache module;

wherein the data transit chip is a frame interpolation chip, and the read module is configured to send a data reading instruction to the display driver integrated circuit causing the display driver integrated circuit to read the first data packet with the first preset quantity of bits from the storage chip according to the data reading instruction, and saving the first data packet in the first cache module.

2. The data transmission circuit according to claim 1, wherein the encoding module comprises an encoding unit and an editing unit, wherein the encoding module comprises a first end and a second end, and the editing unit comprises a first end and a second end;

the first end of the encoding unit is connected to the second cache module, and the second end of the encoding unit is connected to the first end of the editing unit; and the second end of the editing unit is connected to the data processing chip.

3. The data transmission circuit according to claim 1, wherein the data processing chip comprises a third cache module and a memory module, wherein the third cache module comprises a first end and a second end, the first end of the third cache module is connected to the encoding module, and the second end of the third cache module is connected to the memory module.

4. A data transmission method, applied to a data transmission circuit, wherein the data transmission circuit comprises: a storage chip, a data transit chip, and a data processing chip, wherein the storage chip, the data transit chip, and the data processing chip are sequentially connected in series;

the data transit chip is configured to read a first data packet with a first preset quantity of bits from the storage chip, process the first data packet into a plurality of second data packets each with a second preset quantity of bits, and send the second data packets to the data processing chip; and a maximum quantity of bits of a data packet that the data processing chip is able to read at a time is a third preset quantity of bits, the second preset quantity of bits is less than or equal to the third preset quantity of bits, and the first preset quantity of bits is greater than the third preset quantity of bits;

wherein the method comprises:

reading, by a data transit chip, a first data packet with a first preset quantity of bits from a storage chip;

processing, by the data transit chip, the first data packet into a plurality of second data packets each with a second preset quantity of bits; and sending, by the data transit chip, the second data packets to a data processing chip, wherein a maximum quantity of bits of a data packet that the data processing chip is able to read at a time is a third preset quantity of bits, the second preset quantity of bits is less than or equal to the third preset quantity of bits, and the first preset quantity of bits is greater than the third preset quantity of bits;

wherein the data transit chip comprises a read module, a first cache module, a decoding module, a second cache module, and an encoding module;

the reading, by a data transit chip, a first data packet with a first preset quantity of bits from a storage chip comprises:

reading, by the read module, the first data packet with the first preset quantity of bits from the storage chip, and saving the first data packet in the first cache module; and the processing, by the data transit chip, the first data packet into a plurality of second data packets each with a second preset quantity of bits comprises:

decoding, by the decoding module, the first data packet cached in the first cache module, and saving decoded data in the second cache module; and processing, by the encoding module into the plurality of second data packets each with the second preset quantity of bits, data that is read from the second cache module;

wherein the reading, by the read module, the first data packet with the first preset quantity of bits from the storage chip, and saving the first data packet in the first cache module comprises:

sending, by the read module, a data reading instruction to a display driver integrated circuit; and reading, by the display driver integrated circuit, the first data packet with the first preset quantity of bits from the storage chip according to the data reading instruction, and saving the first data packet in the first cache module;

wherein the data transit chip is a frame interpolation chip.

5. The method according to claim 4, wherein the encoding module comprises an encoding unit and an editing unit; and the encoding, by the encoding module into the plurality of second data packets each with the second preset quantity of bits, data that is read from the second cache module comprises:

encoding, by the encoding unit into the plurality of second data packets each with the second preset quantity of bits, the data that is read from the second cache module; and generating, by the editing unit, a first verification code for any one of the second data packets based on the second data packet; and for the any one of the second data packets, adding a start character to a packet header of the second data packet and sequentially adding the first verification code and an end character to a packet trailer of the second data packet, to update the second data packet, and sending the updated second data packet to the data processing chip.

6. The method according to claim 4, wherein the data transit chip comprises a read module, a first cache module, a decoding module, a second cache module, and an encoding module, wherein a first end of the read module is connected to the storage chip;

a second end of the read module, a first end of the first cache module, a second end of the first cache module, the decoding module, the second cache module, and a first end of the encoding module are sequentially connected in series; and a second end of the encoding module is connected to the data processing chip, wherein the read module reads the first data packet with the first preset quantity of bits from the storage chip and saves the first data packet in the first cache module, the decoding module decodes the first data packet cached in the first cache module and saves decoded data in the second cache module, and the encoding module processes, into the plurality of second data packets each with the second preset quantity of bits, data that is read from the second cache module.

7. The method according to claim 6, wherein the data transmission circuit further comprises a display driver integrated circuit, wherein the display driver integrated circuit comprises a first end, a second end, and a third end, and the first cache module further comprises a third end; and the first end of the display driver integrated circuit is connected to the storage chip, the second end of the display driver integrated circuit is connected to the first end of the read module, and the third end of the display driver integrated circuit is connected to the third end of the first cache module.

8. The method according to claim 6, wherein the encoding module comprises an encoding unit and an editing unit, wherein the encoding module comprises a first end and a second end, and the editing unit comprises a first end and a second end;

the first end of the encoding unit is connected to the second cache module, and the second end of the encoding unit is connected to the first end of the editing unit; and the second end of the editing unit is connected to the data processing chip.

9. The method according to claim 6, wherein the data processing chip comprises a third cache module and a memory module, wherein the third cache module comprises a first end and a second end, the first end of the third cache module is connected to the encoding module, and the second end of the third cache module is connected to the memory module.

10. An electronic device, wherein the electronic device comprises a data transmission circuit, wherein the data transmission circuit comprises: a storage chip, a data transit chip, and a data processing chip, wherein the storage chip, the data transit chip, and the data processing chip are sequentially connected in series;

the data transit chip is configured to read a first data packet with a first preset quantity of bits from the storage chip, process the first data packet into a plurality of second data packets each with a second preset quantity of bits, and send the second data packets to the data processing chip; and a maximum quantity of bits of a data packet that the data processing chip is able to read at a time is a third preset quantity of bits, the second preset quantity of bits is less than or equal to the third preset quantity of bits, and the first preset quantity of bits is greater than the third preset quantity of bits;

wherein the data transit chip comprises a read module, a first cache module, a decoding module, a second cache module, and an encoding module, wherein a first end of the read module is connected to the storage chip;

a second end of the read module, a first end of the first cache module, a second end of the first cache module, the decoding module, the second cache module, and a first end of the encoding module are sequentially connected in series; and a second end of the encoding module is connected to the data processing chip, wherein the read module reads the first data packet with the first preset quantity of bits from the storage chip and saves the first data packet in the first cache module, the decoding module decodes the first data packet cached in the first cache module and saves decoded data in the second cache module, and the encoding module processes, into the plurality of second data packets each with the second preset quantity of bits, data that is read from the second cache module;

wherein the data transmission circuit further comprises a display driver integrated circuit, wherein the display driver integrated circuit comprises a first end, a second end, and a third end, and the first cache module further comprises a third end; and the first end of the display driver integrated circuit is connected to the storage chip, the second end of the display driver integrated circuit is connected to the first end of the read module, and the third end of the display driver integrated circuit is connected to the third end of the first cache module;

wherein the data transit chip is a frame interpolation chip, and the read module is configured to send a data reading instruction to the display driver integrated circuit causing the display driver integrated circuit to read the first data packet with the first preset quantity of bits from the storage chip according to the data reading instruction, and saving the first data packet in the first cache module.

11. The electronic device according to claim 10, wherein the encoding module comprises an encoding unit and an editing unit, wherein the encoding module comprises a first end and a second end, and the editing unit comprises a first end and a second end;

the first end of the encoding unit is connected to the second cache module, and the second end of the encoding unit is connected to the first end of the editing unit; and the second end of the editing unit is connected to the data processing chip.

12. The electronic device according to claim 10, wherein the data processing chip comprises a third cache module and a memory module, wherein the third cache module comprises a first end and a second end, the first end of the third cache module is connected to the encoding module, and the second end of the third cache module is connected to the memory module.

* * * * *